United States Patent
Fieger et al.

(10) Patent No.: US 12,437,297 B2
(45) Date of Patent: Oct. 7, 2025

(54) PROCESSING SCHEDULE OF AN ELECTRONIC TRANSACTION

(71) Applicant: Ericsson Telekommunikation GmbH, Frankfurt (DE)

(72) Inventors: Walter Fieger, Egelsbach (DE); Jaroslaw Niewiadomy, Hanau (DE); Heike Scholz, Darmstadt (DE); Gregory Liokumovich, Oberursel (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 18/563,456

(22) PCT Filed: May 28, 2021

(86) PCT No.: PCT/EP2021/064426
§ 371 (c)(1),
(2) Date: Nov. 22, 2023

(87) PCT Pub. No.: WO2022/248065
PCT Pub. Date: Dec. 1, 2022

(65) Prior Publication Data
US 2024/0249271 A1 Jul. 25, 2024

(51) Int. Cl.
G06Q 20/38 (2012.01)
(52) U.S. Cl.
CPC .................. G06Q 20/389 (2013.01)
(58) Field of Classification Search
None
See application file for complete search history.

(56) References Cited

U.S. PATENT DOCUMENTS

2017/0046651 A1\* 2/2017 Lin .................. H04N 5/913
2018/0255131 A1\* 9/2018 Stöcker ................. G06Q 50/40
(Continued)

OTHER PUBLICATIONS

Molina-Jimenez, et al., "On and Off-Blockchain Enforcement of Smart Contracts", Springer Nature Switzerland AG 2019, G. Mencagli et al. (Eds.): Euro-Par 2018 Workshops, LNCS 113399, 2019, 342-354.

*Primary Examiner* — Mohamed Ibrahim
(74) *Attorney, Agent, or Firm* — Murphy, Bilak & Homiller, PLLC

(57) ABSTRACT

There is provided mechanisms for determining a processing schedule of an electronic transaction. A method is performed by a decision engine. The method comprises obtaining an indication that the electronic transaction is to be performed between at least two communication devices. The method comprises determining the processing schedule for transaction processing used for executing the electronic transaction between the at least two communication devices. The processing schedule specifies a distribution of how much of the transaction processing to be performed on-chain using a Blockchain platform and how much of the transaction processing to be performed off-chain using an off-chain computing platform. The processing schedule is determined using parameters identifying processing load and processing performance of each of the Blockchain platform and the off-chain computing platform. The method comprises initiating the transaction processing in accordance with the processing schedule by initiating execution of a smart contract for the at least two communication devices for any of the transaction processing to be performed on-chain and/or initiating opening of a communications channel to the off-chain computing platform for the at least two communication devices for any of the transaction processing to be performed off-chain.

20 Claims, 7 Drawing Sheets

(56) References Cited

U.S. PATENT DOCUMENTS

2020/0175507 A1* 6/2020 Yamakado ........... G06Q 20/389
2021/0232571 A1* 7/2021 Singh Dilip Thakur ....................
                                                    G06F 21/57
2021/0365433 A1* 11/2021 Heo .................... G06F 16/2365

* cited by examiner

PROCESSING SCHEDULE OF AN ELECTRONIC TRANSACTION

TECHNICAL FIELD

Embodiments presented herein relate to a method, a decision engine, a computer program, and a computer program product for determining a processing schedule of an electronic transaction.

BACKGROUND

In general terms, a blockchain is a growing immutable list of records, called blocks, that are linked using cryptography. For use as a distributed ledger, a blockchain is typically managed by a peer-to-peer network collectively adhering to a protocol for inter-node communication and validating new blocks. In public Blockchain environments the number of transactions is typically restricted due to computations on the Blockchain platform requiring a large amount of resource usage like active Blockchain nodes, storage, electric power, processing time.

Layer 2 Blockchain protocols have been developed that allow to process transactions off-chain to increase the number of transactions per time period and reduce the resource usage on the Blockchain as long as the transaction partners trust each other. Layer 2 refers to a secondary framework or protocol that is built on top of an existing Blockchain system. On-chain transactions refer to transactions that are recorded and verified on a blockchain platform. Off-chain transactions do not occur on the Blockchain platform, but instead, are transacted on another electronic system, such as on an off-chain computing platform. Information such as transaction summaries, transaction balances, and/or transaction results are written to the Blockchain periodically or when the off-chain channel is closed.

A short description of layer 2 Blockchain protocols will be provided next. It is assumed that an electronic transaction is to be performed between two (or more) transaction partners. The transactions are performed off-chain, in specified sequences e.g. hourly or daily or when the private channel between the transaction partners is closed, and transaction results are stored on the Blockchain to protocol the interactions and to gain trust between the transaction partners when it comes to further transactions. As long as the transaction partners, according to at least one trust criterion, trust each other, the off-chain processing reduces the resource usage and improves the throughput and only the results from the off-chain processing are stored on the Blockchain. The results of the off-chain processing as well as additional technical parameters such as the number of processed transactions, the number of successful processed transactions, processing time, processor unit consumption, are stored on the Blockchain as aggregated data that can be used for later transaction processing. If during a transaction, the at least one trust criterion for one transaction partner is not fulfilled or there is a disagreement between the transaction partners, or there are issues with the robustness of the off-chain processing, etc., the transaction processing is continued on-chain.

The decision which transactions should be executed off-chain and which transactions should be executed on-chain is currently taken by a human operator monitoring the transaction.

In some scenarios, such as when the transactions are performed between Internet of Things (IoT) devices, there might be a large number of transactions and the transactions are executed automatically. In such scenarios human interactions ideally should be avoided in the decision-making process regarding which transactions should be executed off-chain and which transactions should be executed on-chain.

However, there are currently not any technical solutions that enable an automated decision-making process regarding which transactions should be executed off-chain and which transactions should be executed on-chain, especially where the decision considers different aggregated and actual parameters of both the Blockchain platform and the off-chain computing platform together with a measure of trust between the transaction participants. Further, there are currently not any technical criteria defined to be evaluated for the decision-making process. Further, there are currently not any adaptive control handling in the decision-making process which could react on transaction situations that could occur during the transactions and no technical risk management evaluation is available.

Hence, there is a need for an improved decision-making process for determining which transactions should be executed off-chain and which transactions should be executed on-chain.

SUMMARY

An object of embodiments herein is to address the above issues by providing techniques for determining a processing schedule of an electronic transaction where the above issues are avoided, or at least mitigated or reduced.

According to a first aspect there is presented a method for determining a processing schedule of an electronic transaction. The method is performed by a decision engine. The method comprises obtaining an indication that an electronic transaction is to be performed between at least two communication devices. The method comprises determining the processing schedule for transaction processing used for executing the electronic transaction between the at least two communication devices. The processing schedule specifies a distribution of how much of the transaction processing to be performed on-chain using a Blockchain platform and how much of the transaction processing to be performed off-chain using an off-chain computing platform. The processing schedule is determined using parameters identifying processing load and processing performance of each of the Blockchain platform and the off-chain computing platform. The method comprises initiating the transaction processing in accordance with the processing schedule by initiating execution of a smart contract for the at least two communication devices for any of the transaction processing to be performed on-chain and/or initiating opening of a communications channel to the off-chain computing platform for the at least two communication devices for any of the transaction processing to be performed off-chain.

According to a second aspect there is presented a decision engine for determining a processing schedule of an electronic transaction. The decision engine comprises processing circuitry. The processing circuitry is configured to cause the decision engine to obtain an indication that an electronic transaction is to be performed between at least two communication devices. The processing circuitry is configured to cause the decision engine to determine the processing schedule for transaction processing used for executing the electronic transaction between the at least two communication devices. The processing schedule specifies a distribution of how much of the transaction processing to be performed on-chain using a Blockchain platform and how much of the transaction processing to be performed off-chain using an off-chain computing platform. The processing schedule is determined using parameters identifying processing load and processing performance of each of the Blockchain platform and the off-chain computing platform. The processing circuitry is configured to cause the decision engine to initiate the transaction processing in accordance with the processing schedule by initiating execution of a smart contract for the at least two communication devices for any of the transaction processing to be performed on-chain and/or initiating opening of a communications channel to the off-chain computing platform for the at least two communication devices for any of the transaction processing to be performed off-chain.

According to a third aspect there is presented a decision engine for determining a processing schedule of an electronic transaction. The decision engine comprises an obtain module configured to obtain an indication that an electronic transaction is to be performed between at least two communication devices. The decision engine comprises a determine module configured to determine the processing schedule for transaction processing used for executing the electronic transaction between the at least two communication devices. The processing schedule specifies a distribution of how much of the transaction processing to be performed on-chain using a Blockchain platform and how much of the transaction processing to be performed off-chain using an off-chain computing platform. The processing schedule is determined using parameters identifying processing load and processing performance of each of the Blockchain platform and the off-chain computing platform. The decision engine comprises an initiate module configured to initiate the transaction processing in accordance with the processing schedule by initiating execution of a smart contract for the at least two communication devices for any of the transaction processing to be performed on-chain and/or initiating opening of a communications channel to the off-chain computing platform for the at least two communication devices for any of the transaction processing to be performed off-chain.

According to a fourth aspect there is presented a computer program for determining a processing schedule of an electronic transaction, the computer program comprising computer program code which, when run on a decision engine, causes the decision engine 100 to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects enable determination of which transactions to be executed off-chain and which transactions to be executed on-chain.

Advantageously, these aspects enable the processing schedule of the transaction to be determined automatically, without any human interaction, based on technical parameters identifying processing load and processing performance of each of the Blockchain platform and the off-chain computing platform.

Advantageously, since the processing schedule of the transaction can be determined automatically, without any human interaction, the herein disclosed embodiments can handle scenarios where a large number of transactions is to be performed in a resource-efficient manner.

Advantageously, these aspects enable the processing schedule of the transaction to be determined in situation which otherwise could be blocked by technical issues due to the requirement of human interaction.

Advantageously, since these aspects enable the determination of the processing schedule to be made based on technical parameters, this will lead to a performance gain and reduction of needed resources for the transaction processing.

Advantageously, these aspects enable the processing schedule of the transaction to be determined based on real time combinations of parameters of the Blockchain platform and the off-chain computing platform. This allows to build a prediction about future Blockchain platform characteristics, which improves the quality of the determination.

Advantageously, these aspects enable the processing schedule of the transaction to be re-evaluated and adjusted dynamically in a real time, which allows the processing scheduled to be optimized, keeping a balance between performance, consumed resources, and risks.

Advantageously, these aspects enable transaction results, as well as the processing schedule, to be stored on the Blockchain platform, thereby making this information transparent and traceable.

Advantageously, these aspects can be applied in environments comprising several Blockchain platforms and/or several off-chain computing platforms to select from. This increases flexibility and allows to better optimize the performance as well as available and/or required computational resources.

Advantageously, these aspects enable the determination of the processing schedule to be complemented by security-related parameters as measurement for the trust between the at least two communication devices.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, there is a need for an improved decision-making process for determining which transactions should be executed off-chain and which transactions should be executed on-chain.

In further detail, although layer 2 Blockchain protocols allow to process transactions off-chain to increase the number of transactions per time period and reduce the resource usage on the Blockchain platform, the decision of whether a transaction is to be performed on-chain or off-chain must still be taken by a human operator.

The embodiments disclosed herein in particular relate to mechanisms for determining a processing schedule of an electronic transaction. In order to obtain such mechanisms there is provided a decision engine, a method performed by the decision engine, a computer program product comprising code, for example in the form of a computer program, that when run on a decision engine, causes the decision engine to perform the method.

Figure 1:
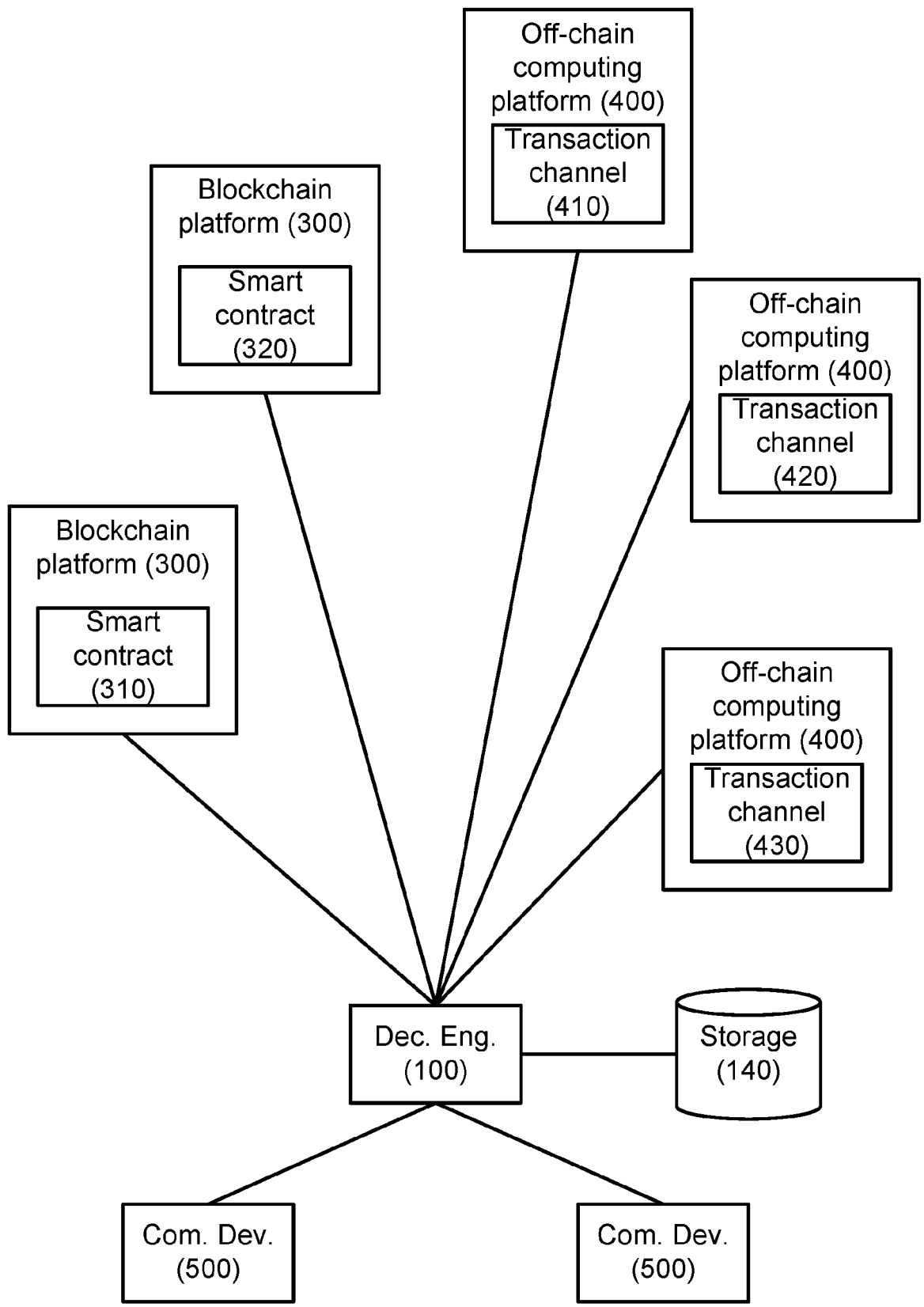
FIG. 1 and FIG. 2 are schematic diagrams of system architectures according to embodiments.

FIG. 1 is a schematic diagram illustrating a system architecture where embodiments presented herein can be applied. An electronic transaction is to be performed between communication devices 500. The communication devices 500 are operatively connected to a decision engine 100. As will be further disclosed below, the decision engine 100 is configured for determining a processing schedule of the electronic transaction.

According to at least some of the herein disclosed embodiments, a processing schedule is determined that specifies a distribution of how much of the transaction processing to be performed on-chain using a Blockchain platform 300 (by execution of a smart contract 310, 320) and how much of the transaction processing to be performed off-chain using an off-chain computing platform 400 (over a transaction channel 410, 420, 430). In this respect, a smart contract is a computer program or a transaction protocol which is intended to automatically execute, control or document legally relevant events and actions according to the terms of a contract or an agreement. General objectives of smart contracts are the reduction of need in trusted intermediators between the communication devices 500, arbitrations and enforcement costs, fraud losses, as well as the reduction of malicious and accidental exceptions. A smart contract can thus be regarded as a computer program that runs on the Blockchain. The smart contract can be implemented as a collection of code (its functions) and data (its state) that resides at a specific address on the Blockchain. As used hereinafter, the smart contract facilitates the execution of the electronic transaction when determined that the electronic transaction is to be performed on-chain using the Blockchain platform 300. Similar to a transfer of value on a Blockchain, deployment of a smart contract on a Blockchain occurs by sending a transaction from a wallet for the blockchain. The transaction includes the compiled code for the smart contract as well as a special receiver address. That transaction must then be included in a block that is added to the blockchain, at which point the smart contract's code will execute to establish the initial state of the smart contract. Byzantine fault-tolerant algorithms can be used secure the smart contract in a decentralized way from attempts to tamper with it.

Information of the processing schedule can be stored in a persistent storage 140. The communication devices 500 could access the information in the persistent storage 140. Additionally or alternatively, information of the processing schedule is stored on the Blockchain platform 300.

According to the processing schedule, the decision engine 100 establishes a connection. The decision engine 100 either opening at least one of the transaction channels 410, 420, 430 of the off-chain computing platform 400 or initiates execution of a smart contract 310, 320 on the Blockchain platform 300. The at least one of the transaction channels 410, 420, 430 of the off-chain computing platform 400 is opened in case at least some of the transaction processing is to be performed off-chain. The execution of a smart contract 310, 320 on the Blockchain platform 300 is initiated in case at least some of the transaction processing is to be performed on-chain.

Figure 2:
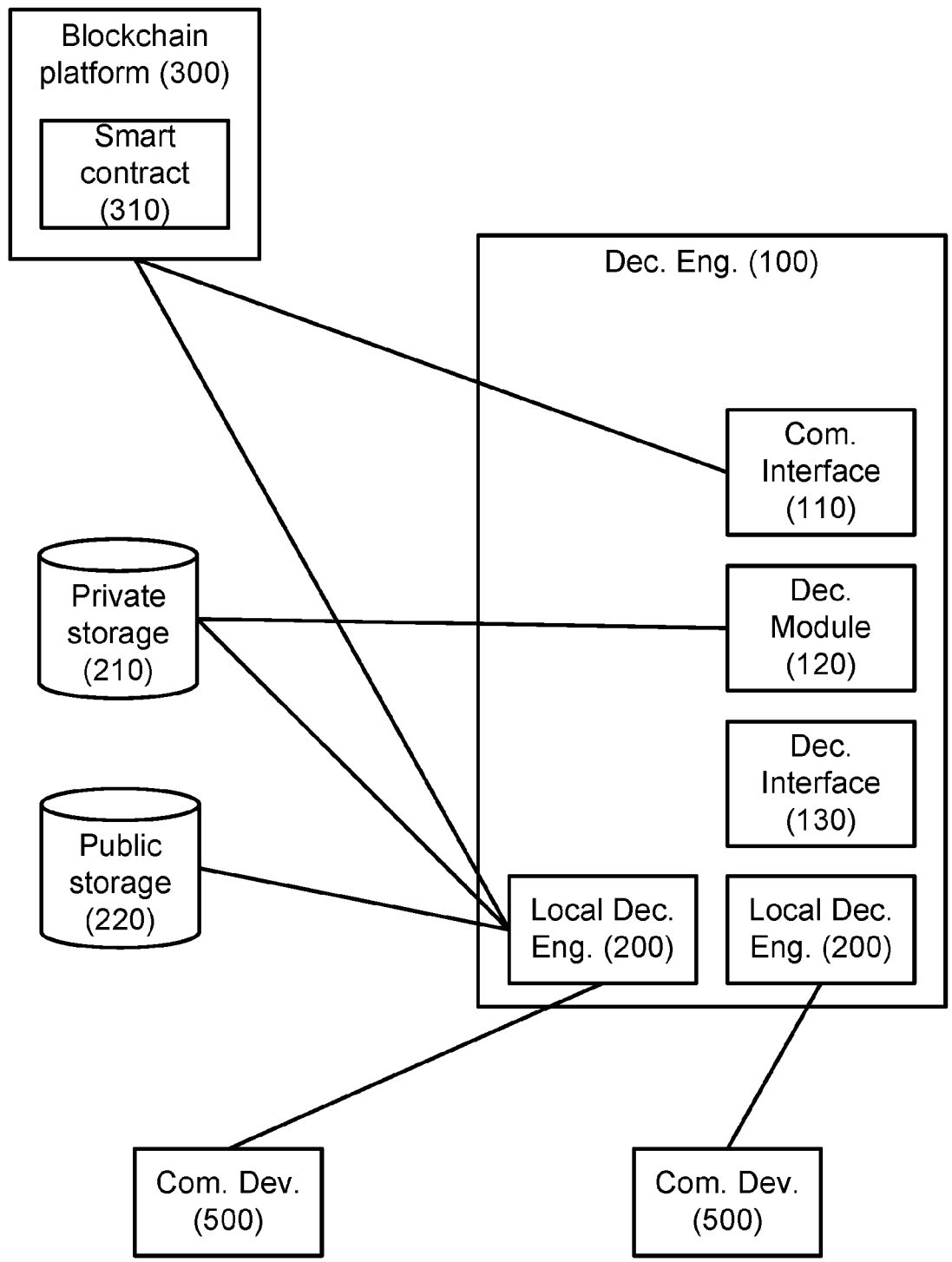

FIG. 2 is a schematic diagram illustrating a system architecture where embodiments presented herein can be applied. In relation to FIG. 1, according to the system architecture of FIG. 2, each communication device 500 has a respective own local decision engine 200 which may be realized as plug-in P1 . . . Px (for x number of communication devices 500). The local decision engines 200 enable the communication devices 500 to define their own rules and the possibility to overrule the processing schedule determined by the decision engine 100 in situation of lost, or decreased, trust between the communication devices 500. Each local decision engines 200 could store and access information in a private storage 210 and/or a public storage 220.

The decision made by each local decision engine 200 can be sent via a decision interface 130 to the decision engine 100 which thus acts as a central decision engine 100. The decision interface 130 could be implemented as a protocol. In one non-limiting and illustrative example, the protocol is defined by each local decision engine 200 providing a Boolean logic value (true or false) to inform the decision engine 100 whether off-chain processing is allowed or if on-chain processing must be used. The interface can also be more detailed and specify the number of transactions allowed to be performed off-chain and/or on-chain, and or/of any time interval during which off-chain processing is allowed.

The determination of the processing schedule about which of the Blockchain platforms 300 and/or off-chain computing platforms 400 to be used is made by a decision module 120. Information of the processing schedule is passed on to a communication interface 100. The communication interface 110 can open channels to different Blockchain platforms 300 to run the smart contracts 310, 320 and/or to different off-chain frameworks 400 (not shown in FIG. 2).

Figure 3:
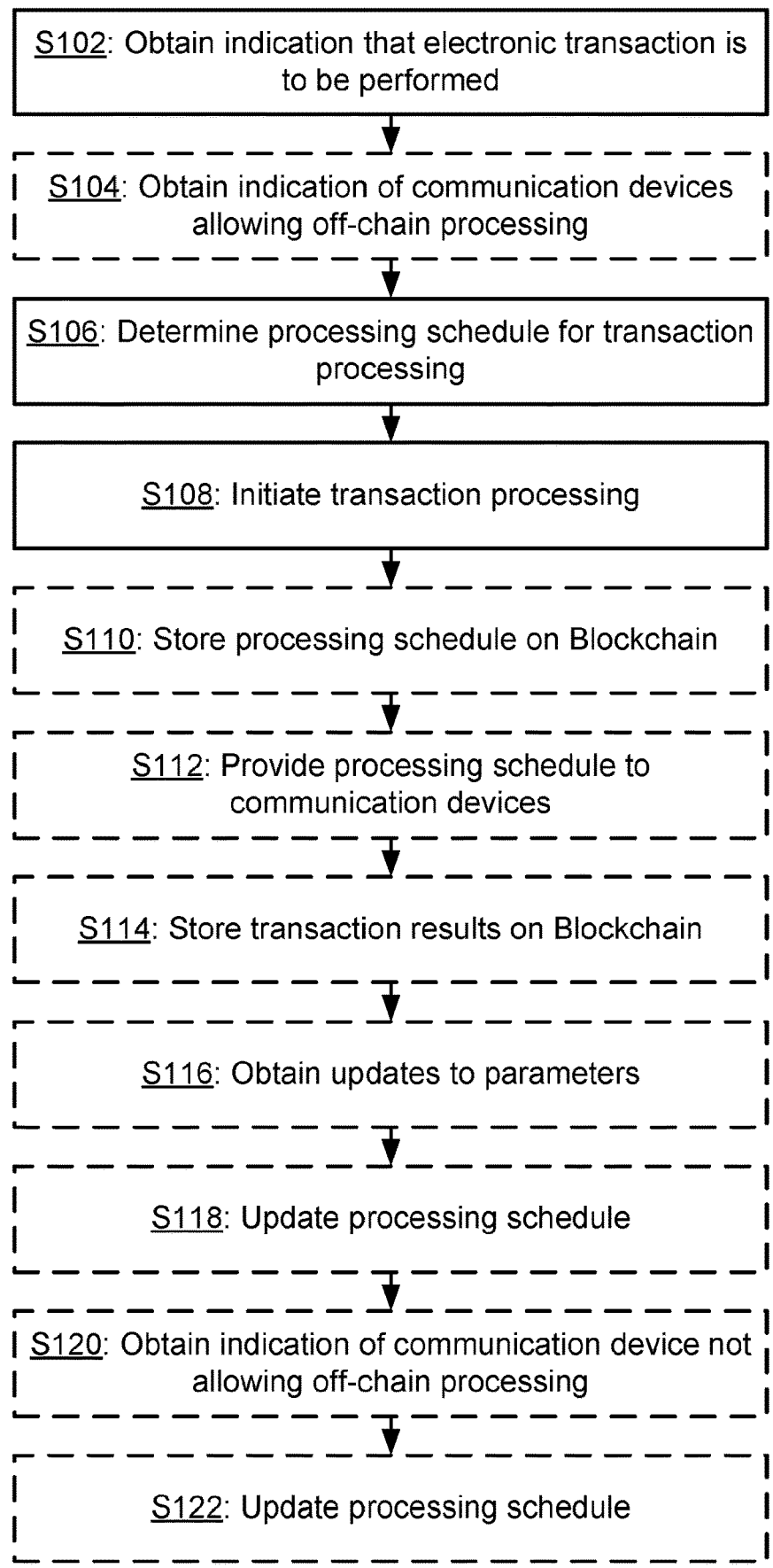
FIG. 3 is a flowchart of methods according to embodiments.

FIG. 3 is a flowchart illustrating embodiments of methods for determining a processing schedule of an electronic transaction. The methods are performed by the decision engine 100. The methods are advantageously provided as computer programs 920.

The decision engine 100 is made aware of that an electronic transaction is to be performed between at least two communication devices 500. In particular, the decision engine 100 is configured to perform step S102:

S102: The decision engine 100 obtains an indication that an electronic transaction is to be performed between at least two communication devices 500.

For example, the at least two communication devices 500 could send a request to the decision engine 100 regarding what type of electronic transaction or how many electronic transactions that is/are to be performed for the at least two communication devices 500 and any technical parameters relating thereto.

Based on the indication and under consideration of technical parameters from the Blockchain platform 300 and the off-chain computing platform 400 the decision engine 100 determines the optimal processing schedule for the electronic transaction. In particular, the decision engine is configured to perform step S106:

S106: The decision engine 100 determines the processing schedule for transaction processing used for executing the electronic transaction between the at least two communication devices 500.

The processing schedule specifies a distribution of how much of the transaction processing to be performed on-chain using a Blockchain platform 300 and how much of the transaction processing to be performed off-chain using an off-chain computing platform 400.

The processing schedule is, by the decision engine 100, determined using parameters. The parameters identify processing load and processing performance of both the Blockchain platform 300 and the off-chain computing platform 400. Non-limiting examples of parameters identifying processing load and processing performance of the Blockchain platform 300 and the off-chain computing platform 400 are provided below.

S108: The decision engine 100 initiates the transaction processing in accordance with the processing schedule. The decision engine 100 initiates the transaction processing by initiating execution of a smart contract 310, 320 for the at least two communication devices 500 for any of the transaction processing to be performed on-chain and/or by initiating opening of a communications channel 410, 420, 430 to the off-chain computing platform 400 for the at least two communication devices 500 for any of the transaction processing to be performed off-chain.

Before an electronic transaction between the at least two communication devices 500 is performed, the decision engine 100 thus evaluates available information and determines the processing schedule for transaction processing used for executing the electronic transaction between the at least two communication devices 500.

The processing schedule might define, or specify, a combination of on-chain processing and off-chain processing for the transaction processing. On-chain processing gains more trust or security but off-chain processing gains a better performance as well as the reduction of Blockchain resource usage (as well as transaction costs). The herein disclosed embodiments can be used to strike a balance between trust or security on the one hand and performance or Blockchain resource usage on the other hand.

According to the processing schedule, a communications channel 410, 420, 430 for off-chain processing is opened and used and/or a smart contract 310 for on-chain transaction processing is executed.

When the transaction processing is to be performed on-chain using the Blockchain platform 300, the electronic transaction is regarded as, or defined as, a Blockchain transaction. That is, if, according to the processing schedule, all transaction processing of the electronic transaction is to be performed on-chain using the Blockchain platform 300, the electronic transaction as a whole is regarded as, or defined as, a Blockchain transaction. Likewise, if, according to the processing schedule, all transaction processing of the electronic transaction is to be performed off-chain using the off-chain computing platform 400, the electronic transaction is never regarded as, or defined as, a Blockchain transaction. Likewise, if, according to the processing schedule, part of the transaction processing of the electronic transaction is to be performed on-chain using the Blockchain platform 300 and part of the transaction processing of the electronic transaction is to be performed off-chain using the off-chain computing platform 400, the electronic transaction is partly regarded as, or defined as, a Blockchain transaction and partly not regarded as, or defined as, a Blockchain transaction.

Embodiments relating to further details of determining a processing schedule of an electronic transaction as performed by the decision engine 100 will now be disclosed.

In some aspects, the decision engine 100 needs to determine the processing schedule only when all communication devices 500 agree that performing the transaction processing on-chain is not necessary. In particular, in some embodiments, the decision engine 100 is configured to perform (optional) step S104 before determining the processing schedule in step S106:

S104: The decision engine 100 obtains, before determining the processing schedule, an indication that each of the at least two communication devices 500 allows at least part of the transaction processing to be performed off-chain.

In some aspects, the processing schedule is stored on the Blockchain platform 300. In particular, in some embodiments, the decision engine 100 is configured to perform (optional) step S110:

S110: The decision engine 100 stores the processing schedule on the Blockchain platform 300.

This enables the processing schedule to be securely stored as well as being connected to the electronic transaction.

In some aspects, the processing schedule is provided to the communication devices 500. In particular, in some embodiments, the decision engine 100 is configured to perform (optional) step S112:

S112: The decision engine 100 provides the processing schedule to the at least two communication devices 500.

In case it is determined that of at least some of the transaction processing is to be performed off-chain, the decision engine 100 might store transaction results back to the Blockchain platform 300. In particular, in some embodiments, the decision engine 100 is configured to perform (optional) step S114 when at least some of the transaction processing has been performed off-chain:

S114: The decision engine 100 stores transaction results of the transaction processing on the Blockchain platform 300.

There could be different criteria according to which the transaction results are to be stored on the Blockchain platform 300. In some embodiments, the transaction results are stored periodically, upon closing of the communication channel 410, 420, 430, and/or when number of un-stored transaction results reaches a threshold.

In some non-limiting and illustrative examples, the communication channel 410, 420, 430 is closed after a certain number of electronic transactions have been performed, and the transaction results are then stored on the Blockchain platform 300. In some non-limiting and illustrative examples, the transaction results are stored in specific time periods. After having stored the transaction results on the Blockchain platform 300, further electronic transactions can be executed on the still open communication channel 410, 420, 430. In some non-limiting and illustrative examples, a configured threshold of number of performed electronic transactions is reached and the transaction results are then stored on the Blockchain platform 300. After the threshold is reached, the communication channel 410, 420, 430 is closed. Further electronic transactions may be executed on-chain or off-chain (by again opening the communication channel 410, 420, 430) depending on the processing schedule.

In some aspects, the processing schedule is continuously revised, enabling the decision engine 100 to react immediately in case of parameter change. In this, respect, in case when at least some of the transaction processing is performed off-chain the decision engine 100 might check periodically that all parameters based on which the processing schedule was determined are still valid. This also enables the decision engine 100 to switch from one off-chain computing platform 400 to another off-chain computing platform 400 if a certain off-chain computing platform 400 does not fulfil performance requirements. In particular, in some embodiments, the decision engine 100 is configured to perform (optional) step S116 and step S118:

S116: The decision engine 100 obtains updates to any of the parameters whilst the electronic transaction is ongoing.

S118: The decision engine 100 updates the processing schedule by reallocating the transaction processing based on the updates for continuing the ongoing electronic transaction.

Further, in some aspects, if at least one of the at least two communication devices 500 does not allow at least part of the transaction processing to be performed off-chain, then all remaining transaction processing of the electronic transaction is to be performed on-chain. In particular, in some embodiments, the decision engine 100 is configured to perform (optional) step S120 and step S122:

S120: The decision engine 100 obtains, whilst the electronic transaction is ongoing, an indication that at least one of the at least two communication devices 500 does not allow at least part of the transaction processing to be performed off-chain.

S122: The decision engine 100, in response thereto, updates the processing schedule by reallocating all remaining transaction processing to be performed on-chain.

As disclosed above, the processing schedule is by the decision engine 100 determined using parameters identifying processing load and processing performance of each of the Blockchain platform 300 and the off-chain computing platform 400.

In some non-limiting examples, the parameters identifying processing load and processing performance of the Blockchain platform 300 pertain to at least one of: the number of active Blockchain platform nodes in the Blockchain platform 300 for performing the transaction processing, the total number of Blockchain platform 300 nodes in the Blockchain platform 300, the number of new blocks per time on the Blockchain platform 300, a specification of the consensus algorithm used by the Blockchain platform 300, the block storage commit time of the Blockchain platform 300, the number of ongoing smart contract operations, a relation between number of requested and executed electronic transactions on the Blockchain platform 300.

In this respect, the available parameters identifying processing load and processing performance could vary from one type, or implementation, of Blockchain platform 300 to another type, or implementation, of Blockchain platform 300 and/or from one type, or implementation, of off-chain computing platform 400 to another type, or implementation, of off-chain computing platform 400.

The relation of active Blockchain nodes and Blockchain network size are an indication of the Blockchain performance and the stability of the Blockchain platform 300. If e.g. the network size is 100 and 99 nodes are active, the maximum computing power is nearly reached.

The number of new blocks per time on the Blockchain platform 300 describes the current load on the Blockchain platform 300 and is an indicator for the performance of the Blockchain platform 300. The more complex the consensus algorithm is and the more nodes that have to reach a consensus before committing an electronic transaction on the Blockchain platform 300, the less number of transactions can be executed per time and the higher are the costs for hardware, electric power, processor processing, etc.

The block storage commit time is a measurement for the transaction processing time and the load on the Blockchain platform 300.

The number of smart contract operations is a measurement for the transaction volume. The higher the number of smart contract operations which have been executed per transaction, the more complex are the electronic transactions.

The relation between proposed and executed requests which results in the number of failed requests indicates the success rate, or stability, of the Blockchain request processing over the time and can also indicate the request load on the Blockchain platform 300. With increasing load or a low stability of nodes the number of failed requests will increase.

In further non-limiting examples, the parameters identifying processing load and processing performance of the off-chain computing platform 400 additionally or alternatively pertain to at least one of: the processor consumption of the off-chain computing platform 400, the available processing time at the off-chain computing platform 400, the number of request timeouts at the off-chain computing platform 400, the average number of electronic transactions performed by the off-chain computing platform 400 per time unit.

These technical parameters could by the decision engine 100 be used to identify the load and performance on the off-chain computing platform 400. For example, the number of off-chain transactions per time is an indicator for the trust which is gained on the off-chain computing platform 400.

With the parameters retrieved from the Blockchain platform 300 and the off-chain computing platform 400 and the ratio between the processing behavior on both technologies the decision engine 100 can calculate the best possible workload and throughput for the electronic transactions, and thus determine the processing schedule.

The processing schedule based to the technical parameters that is calculated for the transactions processing improves the resource utilization (and cost efficiency) and offers a performance gain, which is important for mass data processing on block-chain technology.

The parameters identifying processing load and processing performance of each of the Blockchain platform 300 and the off-chain computing platform 400 are real-time parameters. They reflect the current condition of the system (load, performance, stability). To gain the prediction for the transaction processing, the parameters can be stored together with the transactions on the Blockchain platform 300 or on a storage that is used by the off-chain computing platform 400. If historical values of these parameters are taken into consideration by the decision engine 100, potential performance leaks caused by peak times in the Blockchain platform 300 and/or the off-chain computing platform 400 could be predicted and the transaction processing could be executed at a later point in time (in case of not urgent transactions) to save resources and not put additional stress on existing resources. Taking such a historical evaluation into consideration the transaction processing of the at least two communication devices 500 could be divided over the day and save Blockchain resources and costs on the long run.

In addition to parameters identifying processing load and processing performance of each of the Blockchain platform 300 and the off-chain computing platform 400 the decision engine 100 might further take into consideration other types of parameters when determining the processing schedule. In some embodiments, the processing schedule further is determined using parameters identifying a measure of trust between the at least two communication devices 500, and when the measure of trust is higher than a threshold, a higher amount of the transaction processing is to be performed off-chain than when the measure of trust is lower than the threshold. Parameters relating to a measure of trust between the at least two communication devices 500 could thus be used by the decision engine 100 to evaluate the trust between the at least two communication devices 500. In case of loss of trust, the decision engine 100 can react immediately and overrule the processing schedule as determined based on the parameters identifying processing load and processing performance of each of the Blockchain platform 300 and the off-chain computing platform 400.

There could be different types of measures of trust between the at least two communication devices 500. In some embodiments, the measure of trust is a function of amount of transaction processing per time unit performed off-chain for at least one previous electronic transaction between the at least two communication devices 500, and/or a relation between amount of transaction processing performed off-chain and amount of transaction processing performed on-chain for at least one previous electronic transaction between the at least two communication devices 500.

In some aspects, the processing schedule is further affected by information received by the decision engine 100 from the at least two communication devices 500. In some embodiments, the processing schedule further is determined using parameters, or rules, obtained from the at least two communication devices 500. Each of the at least two communication devices 500 could thereby plug-in its own decision rules to the decision engine 100. These plug-ins could then by the decision engine 100 be used to overrule the processing schedule as determined based on the parameters identifying processing load and processing performance of each of the Blockchain platform 300 and the off-chain computing platform 400 in case of risk increase.

In some scenarios, there are more than one Blockchain platform 300 and more than one off-chain computing platform 400 available for performing the electronic transaction. Then, in some embodiments, determining the processing schedule comprises determining how much of the transaction processing to be performed using each of the more than one Blockchain platform 300 and how much of the transaction processing to be performed using each of the more than one off-chain computing platform 400.

The decision engine 100 could thus be configured to determine which Blockchain platform 300 and which off-chain computing platform 400 to be used. Multi-layer capabilities might be supported by the decision engine 100 to interact with multiple different off-chain computing platforms 400, as well as perform smart contracts 30 on multiple different Blockchain platforms 300 which provide interoperability between Blockchains. The decision for selecting between different Blockchain platforms 300 could depend on the price per transaction or the number of transactions that can be performed on a specific different Blockchain platform 300 per time or the resource consumption Communication channels can be opened to different Blockchain platforms 300 to run the smart contracts 310 and to different off-chain computing platforms 400. In this respect, there might be different consensus algorithms run on different Blockchain platforms 300 which can influence the performance of the transactions. Thus, this aspect also can be taken into account during the determination of the processing schedule.

The transaction processing might either be shared between the Blockchain platform 300 and the off-chain computing platform 400, or be performed exclusively by either the Blockchain platform 300 or the off-chain computing platform 400. In some embodiments, according to the processing schedule, the transaction processing is to be performed partly on-chain and partly off-chain, or fully on-chain, or fully off-chain.

Aspects of the processing schedule will now be disclosed. There could be different type of processing schedules. In some embodiments, the processing schedule is determined in terms of allocation of workload resources and throughput resources for performing the transaction processing. In some embodiments, the processing schedule specifies a distribution of the workload resources and throughput resources between the transaction processing to be performed on-chain and the transaction processing to be performed off-chain. In general terms, performing the transaction processing requires operations to be performed, or executed. The processing schedule can thus define what share of these operations, or what percentage of these operations, or which of these operations that are associated with the transaction processing to be performed, or executed, off-chain and/or what share of these operations, or what percentage of these operations, or which of these operations that are associated with the transaction processing to be performed, or executed, on-chain. Further in this respect, in some non-limiting and illustrative examples, the processing schedule specifies that a specified number of transactions (e.g., in terms of all the operations of these transactions) is to be performed off-chain and then the transaction results are written back to the Blockchain platform 300, and then the processing is continued on-chain for any remaining electronic transactions. In some non-limiting and illustrative examples, the processing schedule specifies that off-chain processing is to be performed for a specified duration in time (or until a specified point in time), and then the processing of the electronic transactions is continued on-chain.

There could be different ways in which the transaction processing is initiated in step S108. In some embodiments, initiating the transaction processing comprises the decision engine 100 to allocate the workload resources and throughput resources for execution of the smart contract 310, 320 and/or for opening of the communications channel 410, 420, 430 to the off-chain computing platform 400 in accordance with the processing schedule.

There could be different entities in which the decision engine 100 is implemented. In some embodiments, functionality of the decision engine 100 is distributed between at least one of the at least two communication devices 500 and a controller separated from each of the at least two communication devices 500. This enables a local determination of the processing schedule based on a first set of parameters to be made at each local decision engine 100 (at one or more of the at least two communication devices 500) and that a final determination of the processing schedule is made by a central decision engine 100 (at a controller separated from each of the at least two communication devices 500) based on input from the local decision engines 100 and possibly also other input in terms of a second set of parameters.

Figure 4:
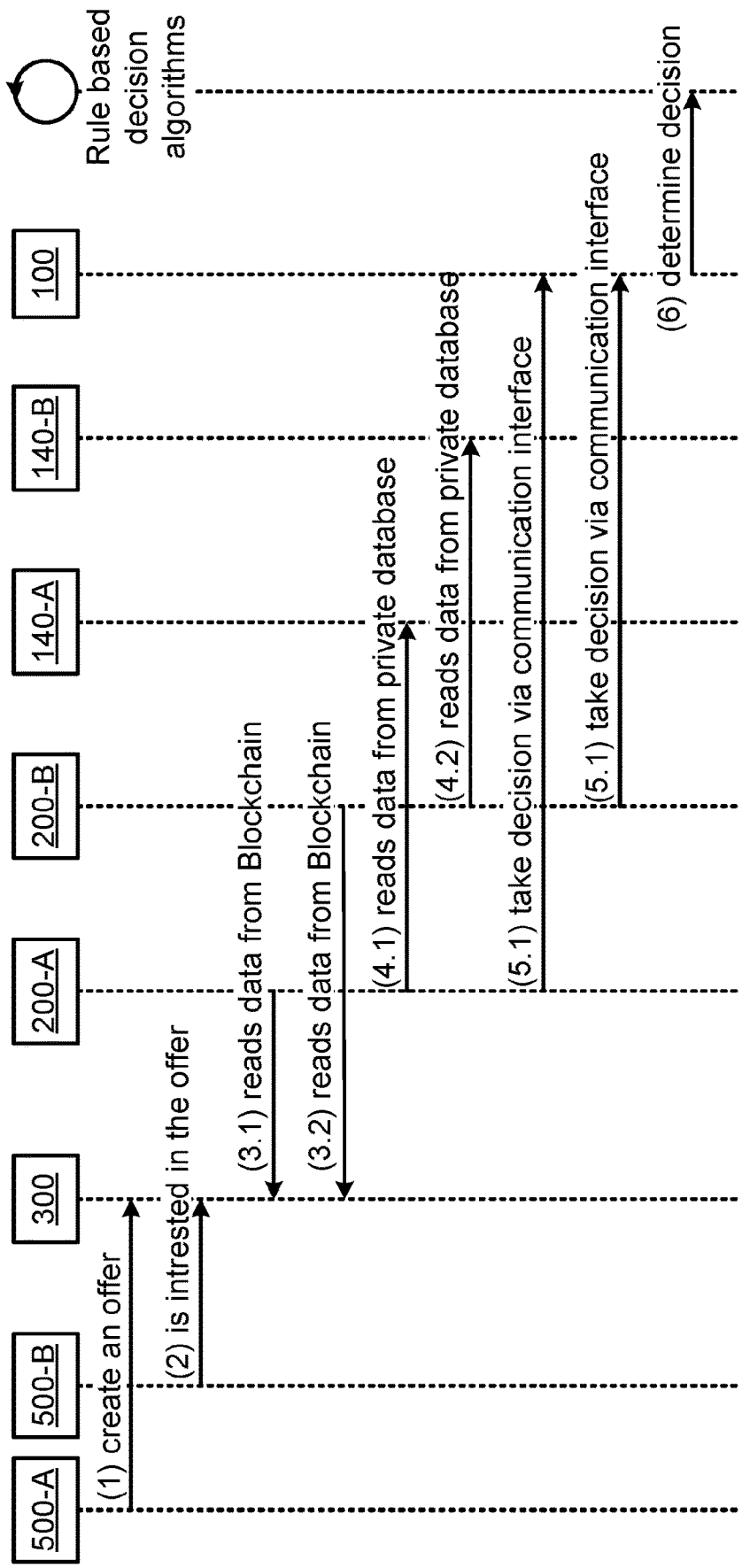
FIG. 4, FIG. 5, and FIG. 6 are signalling diagrams of methods according to embodiments.

Reference is next made to the signalling diagram of FIG. 4 which illustrates a communication flow of the decision-making process between two communication devices 500-A, 500-B, each implementing its own decision engine 200-A, 200-B, and each having its own private database 140-A, 140-B.

Communication device 500-A provides an offer for transaction(s) via Blockchain platform 300 in which communication device 500-B is interested (steps 1 and 2). The local decision engines 200-A, 200-B read transaction related data and platform characteristics from the Blockchain platform 300 (steps 3.1 and 3.2). Additionally, the decision engines 200-A, 200-B access the respective own private databases 140-A, 140-B (steps 4.1 and 4.2) to retrieve a historical information. This information includes historical data about blockchain platform parameters, made transactions, risk related to a given communication device, if available (steps 4.1 and 4.2). Based on the given data the results of the local decision engines 200-A, 200-B are reported via a communication interface to the decision engine 100 (step 5.1 and 5.2). The decision engine 100 uses the provided information from the local decision engines 200-A, 200-B as well as parameters identifying processing load and processing performance of each of the Blockchain platform 300 and the off-chain computing platform 400 to determine a processing schedule for the transaction (step 6).

Figure 5:
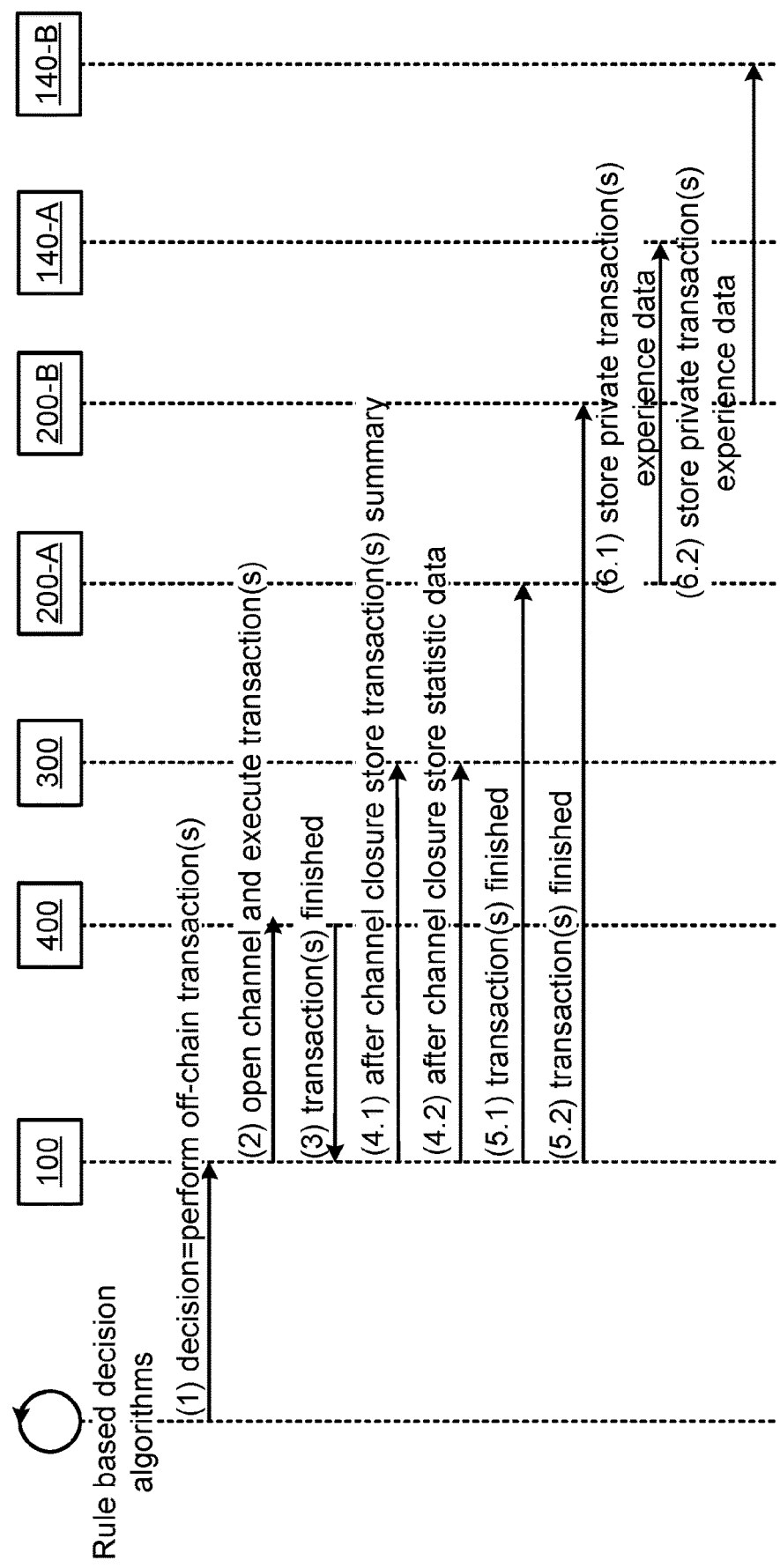

Reference is next made to the signalling diagram of FIG. 5 which illustrates a continuation of the communication flow in FIG. 4 and where it is determined that transaction processing to be performed off-chain.

Based on the given information, the decision engine 100 determines a processing schedule according to which the transaction processing is to be performed off-chain (step 1). For off-chain processing, several transactions (if requested) will be performed on an open communication channel 410, 420, 430 according to the processing schedule. For this, the decision engine 100 opens one or several communication channels 410, 420, 430 towards the off-chain computing platform 400 and executes the transaction(s) (step 2). After the execution of the transaction(s) and channel closure the off-chain computing platform 400 notifies the decision engine 100 (step 3) about the finishing of the transaction execution. The decision engine 100 stores the transaction summary (step 4.1) and transaction statistics (step 4.2) on the Blockchain platform 300. Then decision engine 100 notifies the local decision engine 200-A (step 5.1) and the local decision engine 200-B (step 5.2) about the finishing of the transaction(s) and provides the status of the transactions(s). Based on the received transaction status the local decision engines 200-A, 200-B store the transaction details and status in the own private database 140-A, 140-B (step 6.1 and 6.2).

Figure 6:
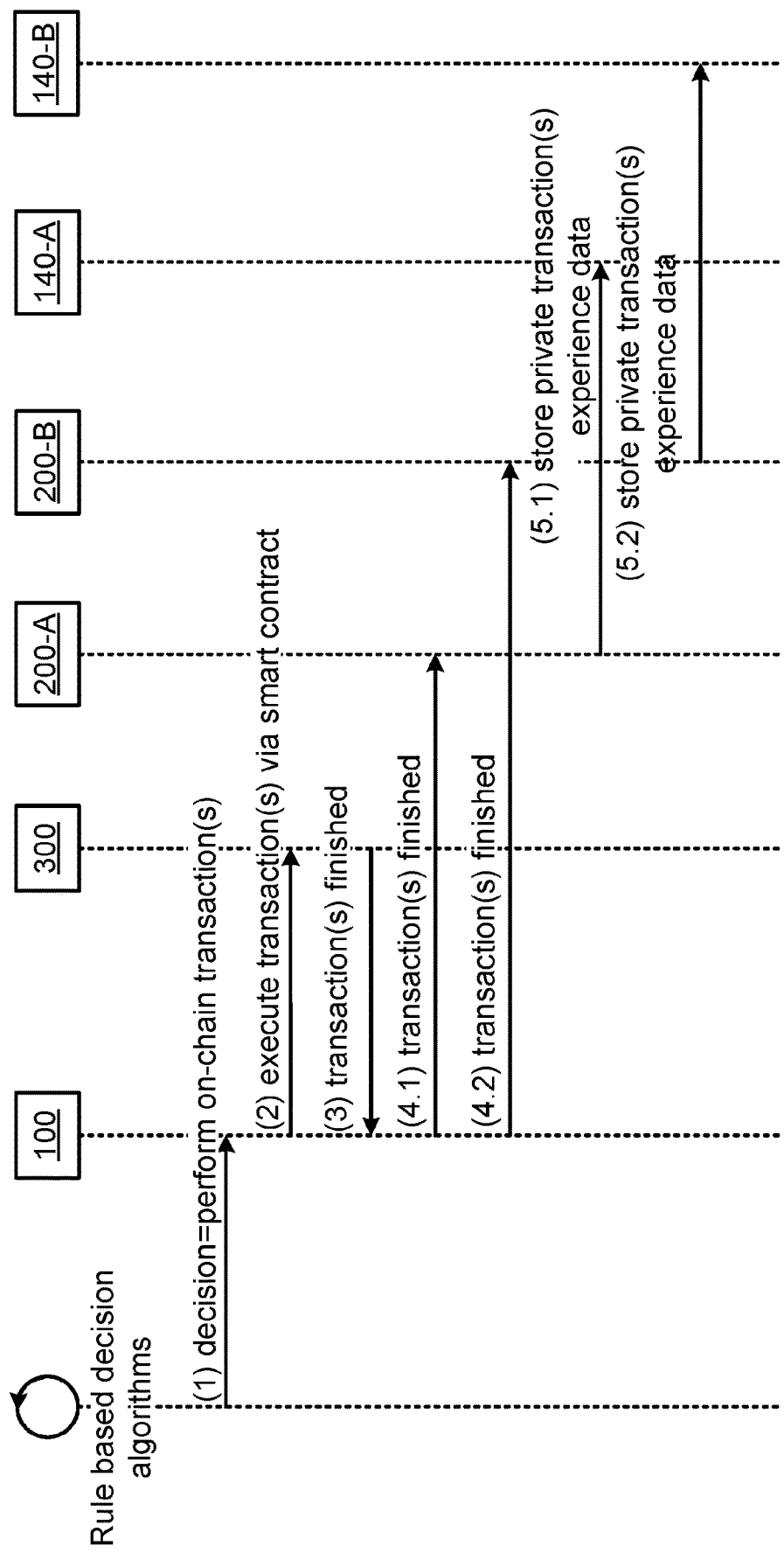

Reference is next made to the signalling diagram of FIG. 6 which illustrates a continuation of the communication flow in FIG. 4 and where it is determined that transaction processing to be performed on-chain.

Based on the given information, the decision engine 100 determines a processing schedule according to which the transaction processing is to be performed on-chain (step 1). For this, the decision engine 100 initiates execution of a smart contract 310, 320 of the transaction(s) on the Blockchain platform 300 (step 2). After completing the execution of the transaction(s) the Blockchain platform 300 notifies the decision engine 100 (step 3) about the finishing of the transaction execution. The decision engine 100 notifies the local decision engine 200-A (step 4.1) and the local decision engine 200-B (step 4.2) about the finishing of the transaction(s) and provides the status of the transactions(s). Based on the received transaction status the local decision engines 200-A, 200-B store the transaction details and status in the own private database 140-A, 140-B (step 5.1 and 5.2).

Figure 7:
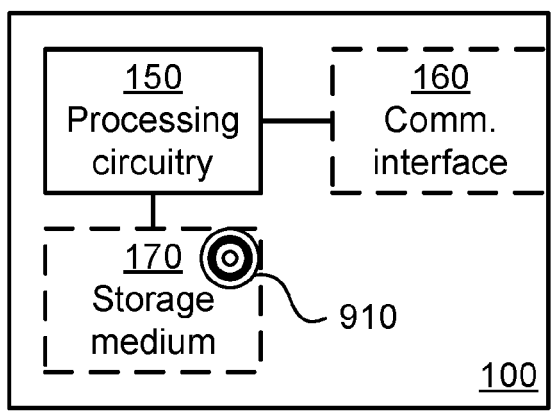
FIG. 7 is a schematic diagram showing functional units of a decision engine according to an embodiment.

FIG. 7 schematically illustrates, in terms of a number of functional units, the components of a decision engine 100 according to an embodiment. Processing circuitry 150 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 170. The processing circuitry 150 may further be provided as at least one application specific integrated circuit (ASIC), or field programmable gate array (FPGA).

Particularly, the processing circuitry 150 is configured to cause the decision engine 100 to perform a set of operations, or steps, as disclosed above. For example, the storage medium 170 may store the set of operations, and the processing circuitry 150 may be configured to retrieve the set of operations from the storage medium 170 to cause the decision engine 100 to perform the set of operations. The set of operations may be provided as a set of executable instructions.

Thus the processing circuitry 150 is thereby arranged to execute methods as herein disclosed. The storage medium 170 may also comprise persistent storage, which, for example, can be any single one or combination of magnetic memory, optical memory, solid state memory or even remotely mounted memory. The decision engine 100 may further comprise a communications interface 160 at least configured for communications with other entities, functions, nodes, platforms, and devices, as illustrated in FIG. 1 and FIG. 2. As such the communications interface 160 may comprise one or more transmitters and receivers, comprising analogue and digital components. The processing circuitry 150 controls the general operation of the decision engine 100 e.g. by sending data and control signals to the communications interface 160 and the storage medium 170, by receiving data and reports from the communications interface 160, and by retrieving data and instructions from the storage medium 170. Other components, as well as the related functionality, of the decision engine 100 are omitted in order not to obscure the concepts presented herein.

Figure 8:
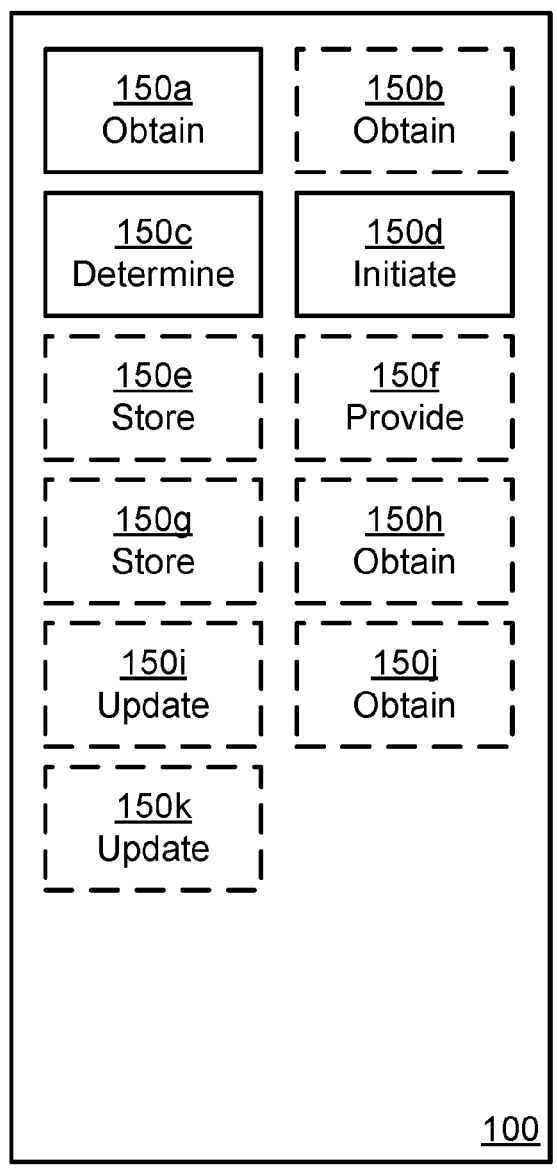
FIG. 8 is a schematic diagram showing functional modules of a decision engine according to an embodiment.

FIG. 8 schematically illustrates, in terms of a number of functional modules, the components of a decision engine 100 according to an embodiment. The decision engine 100 of FIG. 8 comprises a number of functional modules; an obtain module 150a configured to perform step S102, a determine module 150c configured to perform step S106, and an initiate module 150d configured to perform step S108. The decision engine 100 of FIG. 8 may further comprise a number of optional functional modules, such as any of an obtain module 150b configured to perform step S104, a store module 150e configured to perform step S110, a provide module 150f configured to perform step S112, a store module 150g configured to perform step S114, an obtain module 150h configured to perform step S116, a update module 150i configured to perform step S118, an obtain module 150j configured to perform step S120, and a update module 150k configured to perform step S122.

In general terms, each functional module 150a:150k may in one embodiment be implemented only in hardware and in another embodiment with the help of software, i.e., the latter embodiment having computer program instructions stored on the storage medium 170 which when run on the processing circuitry makes the decision engine 100 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 150a:150k may be implemented by the processing circuitry 150, possibly in cooperation with the communications interface 160 and/or the storage medium 170. The processing circuitry 150 may thus be configured to from the storage medium 170 fetch instructions as provided by a functional module 150a:150k and to execute these instructions, thereby performing any steps as disclosed herein.

The decision engine 100 may be provided as a standalone device or as a part of at least one further device. Thus, a first portion of the instructions performed by the decision engine 100 may be executed in a first device, and a second portion of the of the instructions performed by the decision engine 100 may be executed in a second device; the herein disclosed embodiments are not limited to any particular number of devices on which the instructions performed by the decision engine 100 may be executed. Hence, the methods according to the herein disclosed embodiments are suitable to be performed by a decision engine 100 residing in a cloud computational environment. Therefore, although a single processing circuitry 150 is illustrated in FIG. 7 the processing circuitry 150 may be distributed among a plurality of devices, or nodes. The same applies to the functional modules 150a:150k of FIG. 8 and the computer program 920 of FIG. 9.

Figure 9:
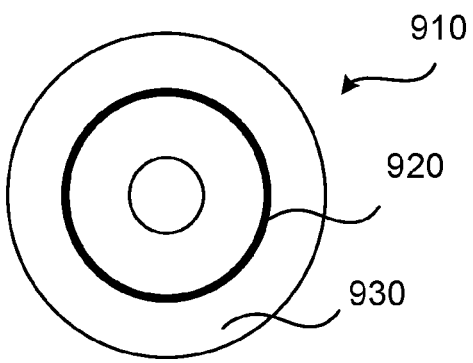
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 150 and thereto operatively coupled entities and devices, such as the communications interface 160 and the storage medium 170, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining a processing schedule of an electronic transaction, the method being performed by a decision engine, the method comprising:
   obtaining an indication that the electronic transaction is to be performed between at least two communication devices;
   determining the processing schedule for transaction processing used for executing the electronic transaction between the at least two communication devices,
      wherein the processing schedule specifies a distribution of how much of the transaction processing is to be performed on-chain using a Blockchain platform and how much of the transaction processing is to be performed off-chain using an off-chain computing platform, and
      wherein the processing schedule is determined using parameters identifying processing load and processing performance of each of the Blockchain platform and the off-chain computing platform; and
   initiating the transaction processing in accordance with the processing schedule by initiating execution of a smart contract for the at least two communication devices for any of the transaction processing to be performed on-chain and/or initiating opening of a communications channel to the off-chain computing platform for the at least two communication devices for any of the transaction processing to be performed off-chain.

2. The method according to claim 1, wherein, when at least some of the transaction processing has been performed off-chain, the method further comprises:
   storing transaction results of the transaction processing on the Blockchain platform.

3. The method according to claim 2, wherein the transaction results are stored periodically, upon closing of the communication channel, and/or when a number of un-stored transaction results reaches a threshold.

4. The method according to claim 1, wherein the processing schedule is determined in terms of an allocation of workload resources and throughput resources for performing the transaction processing.

5. The method according to claim 4, wherein the processing schedule specifies a distribution of the workload resources and throughput resources between the transaction processing to be performed on-chain and the transaction processing to be performed off-chain.

6. The method according to claim 5, wherein initiating the transaction processing comprises allocating the workload resources and throughput resources for execution of the smart contract and/or for opening of the communications channel to the off-chain computing platform in accordance with the processing schedule.

7. The method according to claim 1, wherein the method further comprises:
   storing the processing schedule on the Blockchain platform.

8. The method according to claim 1, wherein the method further comprises:
   providing the processing schedule to the at least two communication devices.

9. The method according to claim 1, wherein the method further comprises:
   obtaining updates to any of the parameters whilst the electronic transaction is ongoing; and
   updating the processing schedule by reallocating the transaction processing based on the updates for continuing the ongoing electronic transaction.

10. The method according to claim 1, wherein the method further comprises:
    obtaining, before determining the processing schedule, an indication that each of the at least two communication devices allows at least part of the transaction processing to be performed off-chain.

11. The method according to claim 1, wherein the method further comprises:
    obtaining, whilst the electronic transaction is ongoing, an indication that at least one of the at least two communication devices does not allow at least part of the transaction processing to be performed off-chain; and in response thereto:
    updating the processing schedule by reallocating all remaining transaction processing to be performed on-chain.

12. The method according to claim 1, wherein the parameters identifying processing load and processing performance of the Blockchain platform pertain to at least one of: a number of active Blockchain platform nodes in the Blockchain platform for performing the transaction processing, a total number of Blockchain platform nodes in the Blockchain platform, a number of new blocks per time on the Blockchain platform, a specification of a consensus algorithm used by the Blockchain platform, a block storage commit time of the Blockchain platform, a number of ongoing smart contract operations, and a relation between a number of requested and executed electronic transactions on the Blockchain platform.

13. The method according to claim 1, wherein the parameters identifying processing load and processing performance of the off-chain computing platform pertain to at least one of: processor consumption of the off-chain computing platform, available processing time at the off-chain computing platform, a number of request timeouts at the off-chain computing platform, and an average number of electronic transactions performed by the off-chain computing platform per time unit.

14. The method according to claim 1, wherein the processing schedule further is determined using parameters identifying a measure of trust between the at least two communication devices, and wherein when the measure of trust is higher than a threshold a higher amount of the transaction processing is to be performed off-chain than when the measure of trust is lower than the threshold.

15. The method according to claim 14, wherein the measure of trust is a function of an amount of transaction processing per time unit performed off-chain for at least one previous transaction between the at least two communication devices, and/or a relation between an amount of transaction processing performed off-chain and an amount of transaction processing performed on-chain for at least one previous transaction between the at least two communication devices.

16. The method according to claim 1, wherein the processing schedule further is determined using parameters, or rules, obtained from the at least two communication devices.

17. The method according to claim 1, wherein there are more than one Blockchain platform and more than one off-chain computing platform available for performing the transaction, and wherein determining the processing schedule comprises determining how much of the transaction processing is to be performed using each of the more than one Blockchain platform and how much of the transaction processing is to be performed using each of the more than one off-chain computing platform.

18. The method according to claim 1, wherein, according to the processing schedule, the transaction processing is to be performed partly on-chain and partly off-chain, or fully on-chain, or fully off-chain.

19. A decision engine for determining a processing schedule of an electronic transaction, the decision engine comprising processing circuitry, the processing circuitry being configured to cause the decision engine to:
    obtain an indication that the electronic transaction is to be performed between at least two communication devices;
    determine the processing schedule for transaction processing used for executing the electronic transaction between the at least two communication devices,
      wherein the processing schedule specifies a distribution of how much of the transaction processing is to be performed on-chain using a Blockchain platform and how much of the transaction processing is to be performed off-chain using an off-chain computing platform, and
      wherein the processing schedule is determined using parameters identifying processing load and processing performance of each of the Blockchain platform and the off-chain computing platform; and
    initiate the transaction processing in accordance with the processing schedule by initiating execution of a smart contract for the at least two communication devices for any of the transaction processing to be performed on-chain and/or initiating opening of a communications channel to the off-chain computing platform for the at least two communication devices for any of the transaction processing to be performed off-chain.

20. A non-transitory computer readable storage medium on which is stored a computer program for determining a processing schedule of an electronic transaction, the computer program comprising computer code which, when run on processing circuitry of a decision engine, causes the decision engine to:
    obtain an indication that the electronic transaction is to be performed between at least two communication devices;
    determine the processing schedule for transaction processing used for executing the electronic transaction between the at least two communication devices,
      wherein the processing schedule specifies a distribution of how much of the transaction processing is to be performed on-chain using a Blockchain platform and how much of the transaction processing is to be performed off-chain using an off-chain computing platform, and
      wherein the processing schedule is determined using parameters identifying processing load and processing performance of each of the Blockchain platform and the off-chain computing platform; and initiate the transaction processing in accordance with the processing schedule by initiating execution of a smart contract for the at least two communication devices for any of the transaction processing to be performed on-chain and/or initiating opening of a communications channel to the off-chain computing platform for the at least two communication devices for any of the transaction processing to be performed off-chain.

* * * * *